United States Patent [19]
King

[11] 3,711,893
[45] Jan. 23, 1973

[54] VENT WINDOW HINGE

[75] Inventor: Ralph J. King, Dearborn Heights, Mich.

[73] Assignee: Ford Motor Company, Dearborn, Mich.

[22] Filed: March 26, 1971

[21] Appl. No.: 128,431

[52] U.S. Cl. ...................16/128, 16/140, 49/384, 16/171
[51] Int. Cl. ...................................E05d 9/00
[58] Field of Search .....287/91; 49/383, 381; 16/128, 16/136, 140, 2, 171; 49/48, 391, 446, 501, 384 X

[56] References Cited

UNITED STATES PATENTS 3,633,316    1/1972    Belser.....................................16/171

*Primary Examiner*—Bobby R. Gay
*Assistant Examiner*—Doris L. Troutman
*Attorney*—John R. Faulkner and John J. Roethel

[57] ABSTRACT

A hinge for swingably mounting a window panel on a vehicle body pillar. The hinge comprises two members, one of which is attached to the window panel and the other of which is fixed to the body pillar. The panel attached hinge member at its distal end has a tubular portion which has interfitting pivotal engagement with a tubular socket portion of the pillar attached hinge member. The body of the pillar attached hinge member has a snap-in retention in an aperture in the body pillar.

2 Claims, 6 Drawing Figures

INVENTOR.
Ralph J. King.
BY John R. Faulkner
John J. Roethel
ATTORNEYS.

VENT WINDOW HINGE

BACKGROUND OF THE INVENTION

In an attempt to simplify construction and to hold material and labor costs to a minimum, a recently introduced subcompact vehicle was manufactured with a fixed or nonswingable rear quarter vent or flipper window. This, of course, has the disadvantage that the degree of ventilation available is reduced, particular in the area of the vehicle body behind the seat. The use of the fixed window results in a saving in the cost of conventional hinge devices and also in labor costs incurred in assembling the hinge devices to the vehicle body. Offsetting the cost saving, however, is the possible loss of vehicle sales due to customer dissatisfaction with the absence of the feature of the pivoted vent window.

It is, therefore, an object of the present invention to provide a hinge device having minimal material cost and requiring minimal assembly line installation time. The use of the hardware involved in the present invention makes it possible to furnish a flipper vent window at a minimal manufacturing cost penalty.

SUMMARY OF THE INVENTION

The vent window hinge device embodying the present invention comprises a first hinge member for attachment to a vent panel and a second hinge member for attachment to a fixed support, such as a body pillar.

The first hinge member has a tubular portion at its distal end. The second hinge member comprises a body having a tubular socket in which the first hinge member tubular portion is received for interfitting pivotal engagement. The body of the second hinge member has snap-fit engagement with respective side edges of an aperture in the fixed support for retention on the latter.

More specifically, the body of the second hinge member comprises a substantially cylindrical portion housing the tubular socket, a positioning flange portion, and a central portion joining the cylindrical portion to the positioning flange. The positioning flange and central portion have a common elongated slot therein in lateral communication with the tubular socket. The entrance to the tubular socket at the bottom of the slot is of lesser dimension than the width of the panel attached hinge member tubular portion. In assembly, the entrance edges of the tubular socket are resiliently separable upon the tubular portion of the first hinge member being forced therebetween and then close toward each other to lock the tubular portion therein.

The resilient side walls of the central body portion on their exterior surfaces have outwardly tapered side projections. These tapered side projections terminates in space relationship to the flange hinge portion to provide retention grooves beneath the latter. The retention grooves receive the side edges of the fixed support aperture therebetween.

DESCRIPTION OF THE DRAWINGS

Further features and advantages of the present invention will be made more apparent as this description proceeds, reference being had to the accompanying drawings, wherein.

DETAILED DESCRIPTION OF THE INVENTION

Figure 1:
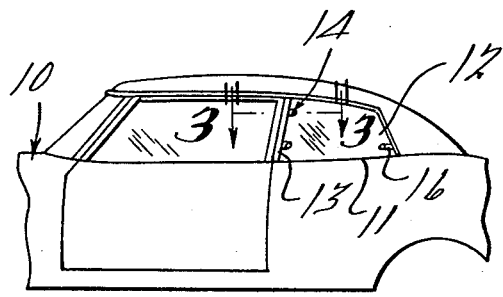
FIG. 1 is a fragmentary side elevation of a vehicle body in which a vent window utilizing the hinge device embodying the present invention is adapted to be mounted.
Figure 2:
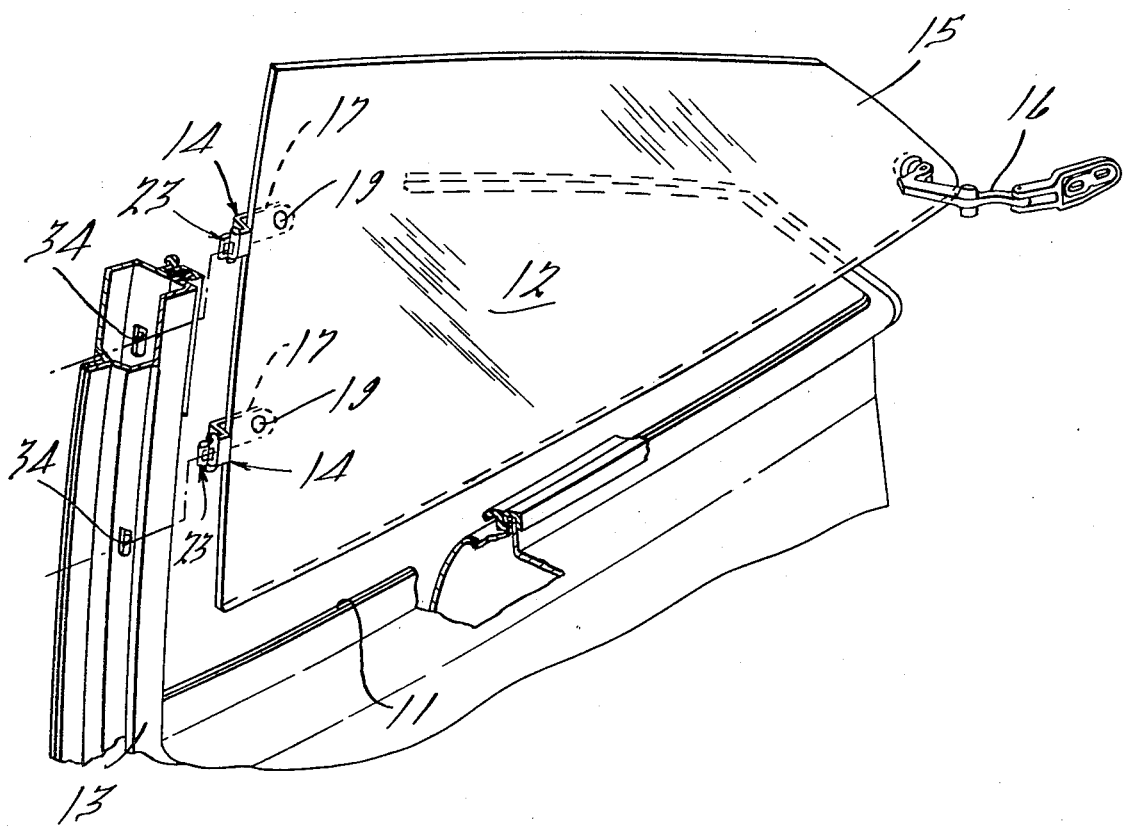
FIG. 2 is an enlarged exploded view of the window assembly.
Figure 3:
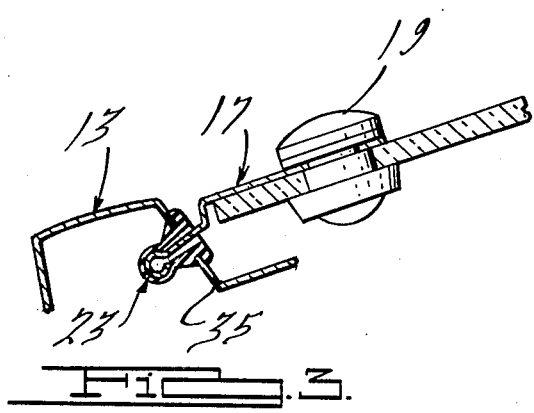
FIG. 3 is a sectional view on the line 3—3 of FIG. 1.

Referring now to the drawings, there is illustrated a vehicle body 10 having at 11 a window opening adapted to receive a ventilation window panel 12. The vehicle body style shown is a two door sedan and the window opening 11 is located in the body structure to the rear of the body pillar 13 defining one side of the door opening. The body structure to the rear of pillar 13 is known as the rear quarter panel and the window panel 12 appropriately is known as the "quarter vent window."

The window panel 12 is hinged by hinge devices 14 to the body pillar 13 and is selectably swingably between opened and closed positions relative to the body opening about a vertical hinge axis as determined by the hinge devices 14. At its rear end 15, the window panel 12 is coupled to the window opening frame by a toggle latch device 16 which functions to hold the panel either in a predetermined opened position or in a fully closed and latched position, as the case may be. The details of the toggle latch device 16 form no part of the present invention. The present invention is embodied in the hinge device 14 and the manner in which these hinge devices pivotally mount the window panel on the body pillar 13.

Each hinge device 14 comprises two hinge members. The first of the hinge members is a hinge leaf 17 having a flat portion 18 bolted or riveted at 19 directly to the vent panel 12. The hinge leaf 17 has an offset angularly inclined portion 21 which at its distal end is roll-formed into a cylindrical or tubular portion 22.

The second hinge member or retainer 23 is a molded plastic member. It may be molded of "Nylon" or other stiffly resilient plastic material. The body of hinge member 23 comprises a substantially cylindrical portion 24, a central portion 25 and a flange portion 26.

Figure 5:
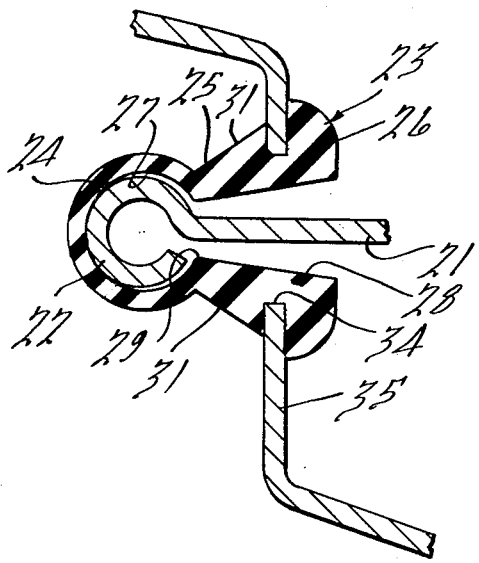
FIG. 5 is an enlarged fragmentary sectional view illustrating the hinge device in assembled relationship in the vehicle body pillar or structural member.

The cylindrical portion 24 houses a tubular socket 27 adapted to receive the tubular portion 22 of the hinge leaf 17, as will be more fully explained. The central body portion 25 and the body flange portion 26 are formed with an elongated slot 28 which is in lateral communication with the tubular socket 27. The entrance 29 to the tubular socket 27 at the bottom of the slot 28 is of somewhat lesser dimension than the diameter of the tubular portion 22 on the hinge leaf 17 (see FIG. 5).

Figure 6:
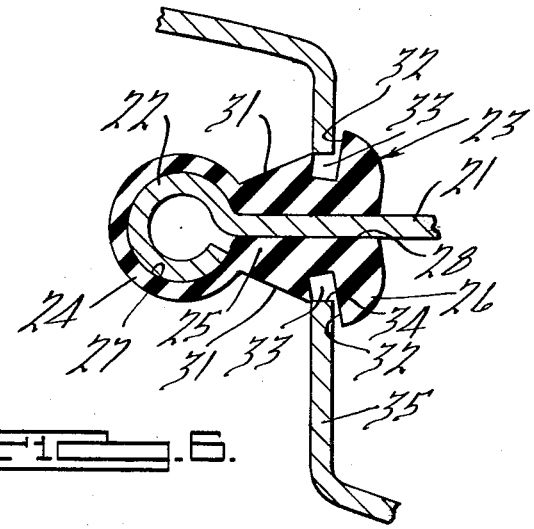
FIG. 6 is an enlarged fragmentary sectional view in part similar to FIG. 5 illustrating the hinge members as they appear as the hinge device is being assembled to the body pillar or structural member.

The side walls of the central body portion 25 of the retainer 23 have outwardly tapered projections 31 which terminates in spaced relationship to the under side 32 of the flange portion 26 thus forming longitudinally extending retention grooves 33 beneath the flange portion (see FIG. 6).

The retention grooves 33 are adapted to fit over the marginal edges of an aperture 34 in the sheet metal wall 35 forming part of the vehicle body pillar 13.

Figure 4:
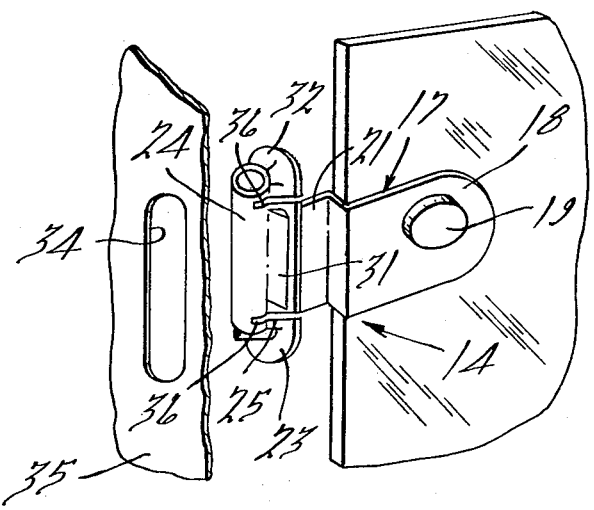
FIG. 4 is an enlarged perspective view of the hinge device immediately prior to insertion into a retaining aperture in a vehicle body structural member.

To increase the flexibility of its side walls, the body of the retainer 23 is cut at each end of slot 28 to provide narrow slits 35 which extend into the cylindrical portion 24 (see FIG. 4).

The assembly of the ventilation window panel 12 to the vehicle body pillar 13 utilizing the hinge devices 14 of the present invention requires the following steps. First, the upper and lower hinge leafs are directly bolted or riveted to the window panel 12 by use of suitable fasteners 19, the window panel being suitably apertured to receive the bolts or rivets. Next, the second hinge member or retainer 23 is pressed over the tubular portion 22 on the distal end of each hinge leaf 17. This is done by aligning the slot 28 on the second hinge member 23 with the tubular portion 22. The two are then forced together so that tubular portion 22 is forced between the bottom edges 29 of the slot 28 until the tubular portion 22 snaps into the tubular socket 27 in the cylindrical portion 24. The fact that the side walls of the second hinge member or retainer body portion 23 are slit, as at 36, permits the side walls to resiliently yield to enlarge the entrance 29 into the tubular socket 27. As soon as the tubular portion passes into the socket 27, the side walls of the central portion of the retainer body are self-restoring to the free state, substantially that shown in FIG. 5, and the tubular portion is held against withdrawal from the tubular socket.

The window panel 12 with the assembled hinge devices 14 then may be shipped to the assembly line for installation into a vehicle body. This is accomplished by inserting the cylindrical portion 24 of each hinge device 14 through an aperture 34 in the wall 35 of the body pillar 13. Because the exterior side walls of the central body portion 24 has tapered projections 31, the side walls collapse inwardly as shown in FIG. 6 until the retention grooves 33 become aligned with the sheet metal of the wall 35 of the pillar 13.

FIG. 6 illustrates the relationship of the second hinge member or retainer 23 with the sheet metal wall 35 just prior to this alignment condition being achieved. It will be readily apparent that just a little further movement of the retainer 23 in a direction to cause the under side 32 of the retainer flange portion 26 to abut the outer surface of the wall 35 will result in the retention grooves 33 snapping over the sheet metal 35. This results in the relationship shown in FIG. 5 in which relationship the window panel 12 is now hinged for pivotal or swinging movement in the window opening in the vehicle body.

The foregoing construction and arrangement has several advantages, as follows:

1. Permits anchoring of the hinge device to a slot from one side when conditions prevent access from the opposite side. (It will be noted that the pillar 13 is a closed box with access only through the exterior of the wall 35.)
2. Permits preassembly of the hinge on the window panel allowing direct or "snap-in" assembly on the assembly line.
3. Allows ample lateral retention of the window assembly which is necessary for proper functioning of the toggle type window latch.
4. Allows pivotal freedom of the tubular portion of the hinge leaf in the tubular socket in the retainer.
5. Minimizes window tilt in a plane of a window and additional loading on the latch as has occurred in systems utilizing a hinge retainer secured to or cushioned in a rubber grommet.

It is to be understood that this invention is not limited to the exact construction illustrated and described above, but that various changes and modifications may be made without departing from the spirit and scope of the invention as defined by the following claims.

What I claim is:

1. A hinge device comprising a first hinge member for attachment to a swingable panel and a second hinge member for attachment to an apertured supporting wall, the first hinge member having a tubular portion at its distal end, and the second hinge member comprising a substantially cylindrical body portion, a positioning flange portion and a central body portion joining the cylindrical body portion to the positioning flange portion, the cylindrical body portion having a tubular socket in which the first hinge member tubular portion is received for interfitting pivotal engagement, the positioning flange and central body portion having an internal elongated slot common thereto in lateral communication at its bottom with the tubular socket, the entrance to the tubular socket at the bottom of the slot being of lesser dimension than the width of the panel attached hinge member tubular portion, the entrance edges of the tubular socket being resiliently separable upon the tubular portion being forced therebetween and then closing toward each other to lock the tubular portion therein, the side walls of the central body portion having outwardly tapered side projections on their exterior surfaces, the tapered side projections terminating in spaced relationship to the flange portion to provide retention grooves beneath the latter, the retention grooves receiving the side edges of the aperture of the fixed support wall therebetween, when assembled, the swingable panel and the positioning flange portion of the second hinge member being located on one or the outer side of the fixed supporting wall and the cylindrical and central body portions being located on the other or inner side of the wall.

2. A hinge device according to claim 1, in which:

the internal elongated slot has tapered side walls to provide a slot decreasing in lateral width from top to bottom, the lateral width of the slot controlling the extent of swinging movement of the swingable panel.

* * * * *